United States Patent [19]

Waltrich et al.

[11] Patent Number: 4,722,191

[45] Date of Patent: Feb. 2, 1988

[54] HIGH VACUUM PUMPING SYSTEM

[75] Inventors: Paul F. Waltrich, Hatboro; Henry O. Herrmann, Philadelphia, both of Pa.

[73] Assignee: Pennwalt Corporation, Philadelphia, Pa.

[21] Appl. No.: 76,426

[22] Filed: Jul. 21, 1987

Related U.S. Application Data

[63] Continuation of Ser. No. 908,490, Sep. 17, 1986, abandoned.

[51] Int. Cl.⁴ .............................................. B01D 8/00
[52] U.S. Cl. ...................................... 62/55.5; 55/269; 62/268
[58] Field of Search ...................... 62/55.5, 100, 268; 55/269

[56] References Cited

U.S. PATENT DOCUMENTS

| | | | |
|---|---|---|---|
| 2,879,157 | 3/1959 | Batutis et al. | 62/55.5 |
| 2,985,356 | 5/1961 | Beecher | 62/55.5 |
| 3,019,809 | 2/1962 | Ipsen et al. | 62/55.5 |
| 3,392,538 | 7/1968 | Mongodin | 62/55.5 |
| 3,797,264 | 3/1974 | Thibault et al. | 62/55.5 |
| 4,072,025 | 2/1978 | Thibuult | 62/55.5 |
| 4,506,513 | 3/1985 | Max | 62/55.5 |
| 4,541,249 | 9/1985 | Graves et al. | 62/55.5 |

OTHER PUBLICATIONS

See art cited in U.S. Ser. No. 908,490; copy of form PTO-892 herewith.

Primary Examiner—Ronald C. Capossela

[57] ABSTRACT

High vacuum pumping system employs a poppet valve having dual seats for respectively seating a pair of vertically disposed spaced valve discs thereon to define a closed position. A refrigerated cold trap is located within a dome portion of the valve, i.e., above the upper of the valve discs while seated, and a diffusion pump is mounted below the valve to evacuate the vacuum process chamber when the discs are elevated or unseated to define an open position. The cold trap and diffusion pump are mounted in parallel and form a common axis with the poppet valve thereinbetween. Means are provided to equalize the pressures within the dome and vacuum process chamber when the discs are seated.

9 Claims, 4 Drawing Figures

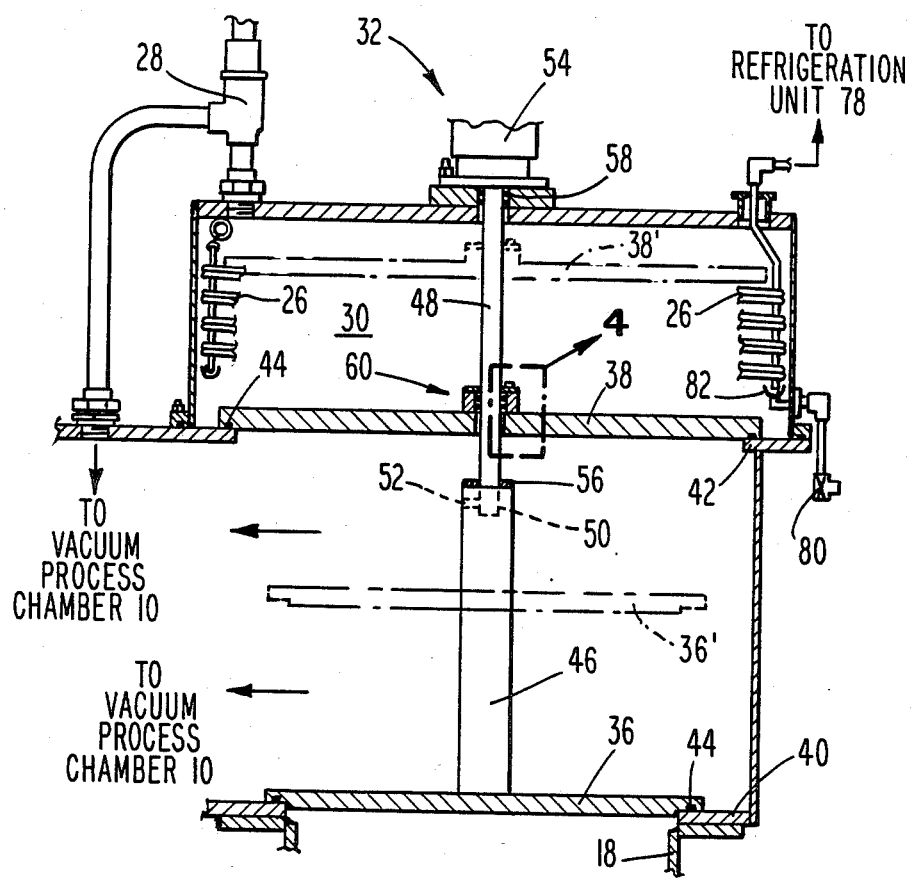
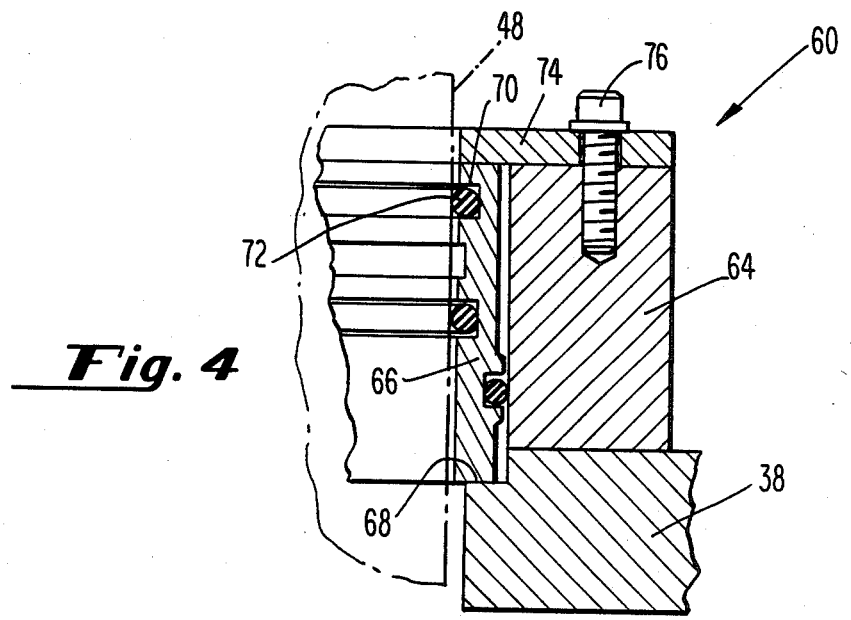

HIGH VACUUM PUMPING SYSTEM

This is a continuation of co-pending application Ser. No. 908,490 filed on Sept. 17, 1986, now abandoned.

STATEMENT OF THE INVENTION

This invention relates to high vacuum pumping systems and more particularly to a parallel mounting of a cold trap and high vacuum diffusion pump using a poppet valve provided with a dual seat.

BACKGROUND AND SUMMARY OF THE INVENTION

High vacuum processing units such as vacuum coaters and metallizers routinely use diffusion pumps as a pumping source in the high vacuum range. Typically, a single-seated high vacuum poppet valve is employed to isolate the diffusion pump from the processing unit, thus providing rapid cycling of vacuum in the vacuum process chamber by permitting the diffusion pump to be brought in-line quickly by the simple expediency of having an operator open the poppet valve between the vacuum process chamber and an already operating diffusion pump, thereby obviating the need to wait for the diffusion pump to achieve operating temperature.

To assist in removing the condensable vapors which desorb from the walls of the vacuum process chamber, it is common practice to install a refrigerated surface or "cold trap" and to pump the desorbed vapors therefrom. The cold trap and diffusion pump provide a very effective high vacuum pumping system, especially when conditions of high humidity are present.

Normally, the cold trap is physically located between the single-seated poppet valve and diffusion pump which permits the poppet valve to effectively isolate the cold trap as well as the diffusion pump from the vacuum process chamber whenever the high vacuum system is not needed to pump in the chamber. Such an arrangement however presents several disadvantages:

(1) Placing the trap in front of the diffusion pump creates a partial obstruction of the pump inlet resulting in a reduction in pumping speed to as low as 35% of nominal rated speed.

(2) Defrosting of the cold trap to remove accumulated frozen water vapor therefrom requires the evolved water to pass out through the pump. If the rate of vapor evolution is sufficiently high, a resultant pressure rise in the pump can backstream the pump oil onto the poppet valve for possible eventual migration of the oil into the vacuum process chamber work area.

The present invention involves moving the refrigerated cold trap from a position in front of the inlet of the diffusion pump to another position along their existing common axes to thereby dispose the trap and pump in a parallel relationship. Operating along the existing common axis is a poppet valve provided with dual seats, the upper of which cooperates with a valve disc to form a dome which houses the refrigerated coils or cold trap, and the lower of which coacts with another valve disc cooperating with the diffusion pump. The advantages resulting from the above arrangement will be more fully understood from the drawings and description thereof hereinafter presented.

BRIEF DESCRIPTION OF THE DRAWINGS

FIG. 3 is an elevational view of the double-seated poppet valve of the present invention, the valve being shown partially sectioned, partially diagrammatic and part in phantom, parts being omitted for clarity of illustration.

FIG. 4 is an enlarged fragmented sectional view of FIG. 3 taken along line 4—4 thereof.

DETAILED DESCRIPTION OF THE INVENTION

Figure 1:
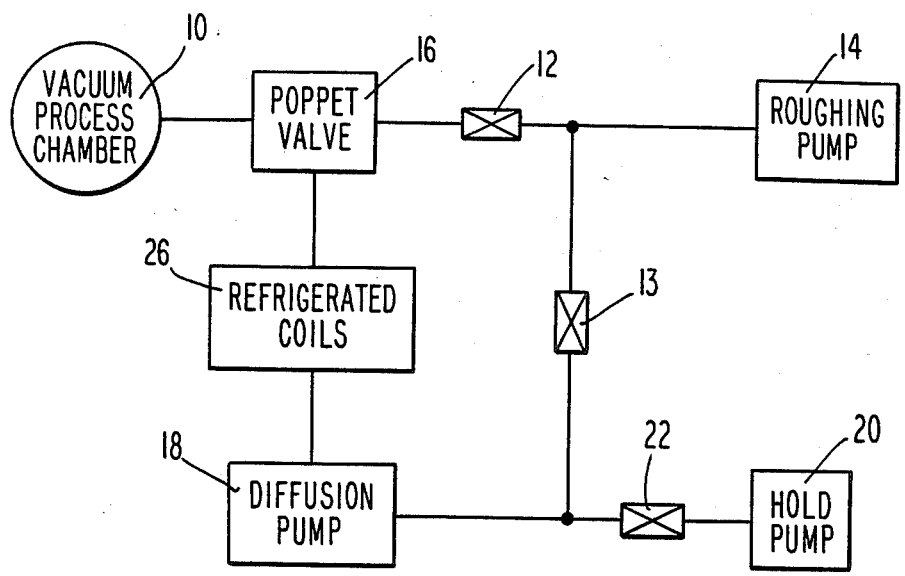
FIG. 1 is a diagrammatic representation of a Prior Art high vacuum pumping system.

In FIG. 1, vacuum process chamber 10 is loaded with workpieces, typically plastic parts to be vacuum coated with aluminum. After the chamber door is closed, roughing valve 12 is opened and roughing pump 14 initiates evacuation of chamber 10 through the roughing port (not shown) of a conventional single-seated high vacuum poppet valve 16. When the pressure within chamber 10 approaches about 0.1 torr, roughing valve 12 is closed and poppet valve 16 opened, thus allowing an already operating diffusion pump 18 to be quickly brought in-line. Diffusion pump 18 is capable of reducing the pressure within chamber 10 to approximately $10^{-4}$ to $10^{-6}$ torr. Diffusion pump 18 is backed by a conventional hold pump 20 through valve 22. When poppet valve 16 opens, a large gas load passes into diffusion pump 18, causing valve 22 to automatically close and valve 24 to open. Roughing pump 14 now backs the diffusion pump 18.

The location of the refrigerated coils or cold trap 26 upstream of the diffusion pump 18 and downstream of poppet valve 16 produces serious drawbacks to the efficient operation of the pumping system, discussed previously.

Figure 2:
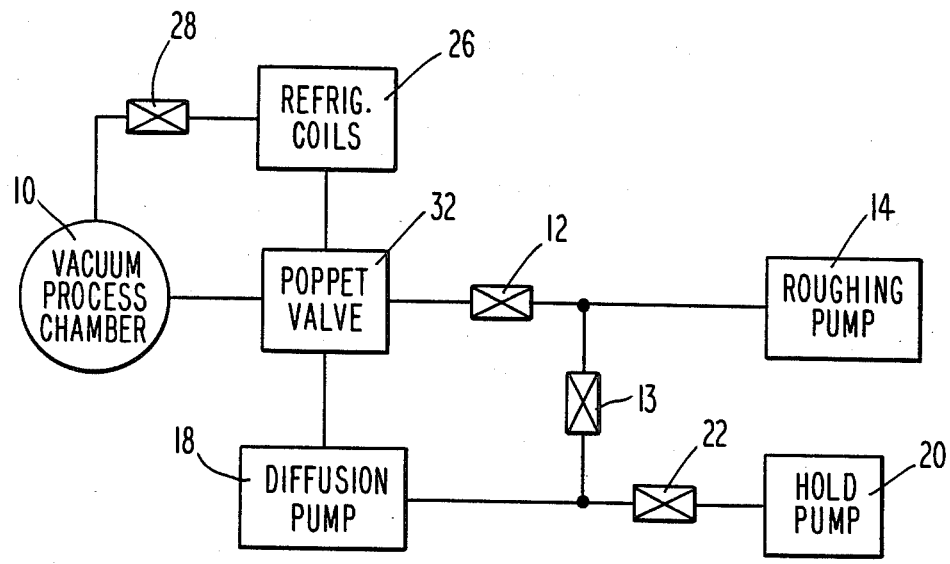
FIG. 2 is a diagrammatic representation of the improved high vacuum pumping system of the present invention.

In FIG. 2, the refrigerated cold trap 26 is removed from a position upstream of the inlet of diffusion pump 18 and repositioned along their same or existing axes; the cold trap however is now in parallel disposition with the diffusion pump. An equalizing valve 28 located between chamber 10 and refrigerated coils 26 serves to equalize the pressure between the chamber and a dome 30, later described, disposed at an upper portion of poppet valve 32 (FIG. 3). Refrigerated coils or cold trap 26 is housed within the dome.

Several advantages of the arrangement of components illustrated in FIG. 2 of the drawings are:

(1) Cold trap 26 no longer presents an obstruction to the flow of vapors into diffusion pump 18.

(2) Cold trap 26 may be isolated from both the vacuum process chamber 10 and diffusion pump 18 during defrosting of the cold trap, thus enabling evolved vapors to be removed directly therefrom without the necessity of the vapors passing through the diffusion pump.

(3) Isolation may be achieved for both the cold trap and diffusion pump by means of a single poppet valve operator.

(4) The physical arrangement of the improved high vacuum pumping system of the present invention lends itself to an add-on to, or retrofit for, existing vacuum coating installations.

Conduits interconnecting the vacuum process chamber, valves, coils, and pumps are not described herein, it being understood that suitable conduit diameters, lengths, and materials may be readily selected and employed by those skilled in the art.

In order to permit the repositioning of the cold trap with the attendant advantages resulting therefrom as recited hereinabove, dual-seated poppet valve 32 is provided with a lower valve disc 36 and an upper valve disc 38, each seated on horizontally disposed flange members 40 and 42 respectively with O-rings 44 disposed in sealing relationship between the respective valve discs and flange members.

Lower valve disc 36 is secured to a shaft 46. Pin shaft 48 is suitably screw-threadedly mounted at 50 into shaft 46, in alignment therewith, and conveniently keyed thereto at 52. Air cylinder 54, mounted above poppet valve 32, cause pin shaft 48 and shaft 46 to travel vertically upwardly and downwardly. More specifically, upon opening of poppet valve 32, shafts 46 and 48 travel upwardly causing lower valve disc 36 to separate from its seat on flange 40 and allowing diffusion pump 18, suitably mounted below a lower portion of the poppet valve, to continue evacuation of the vacuum process chamber.

Shaft 46 is provided with a bumper pad 56, typically an annulus or ring, at an uppermost portion thereof. Thus, when shaft 46 and lower valve disc 36 are being elevated, bumper pad 56 impacts the undersurface of upper valve disc 38 to carry it to its open position 38' within coils 26 while the lower valve disc is similarly being carried to its open position 36'. The distance between bumper pad 56 and upper valve disc 38 is conveniently about 4". Thus, when lower valve disc 36 travels about 16" to its open position at 36', shown in phantom, the upper valve disc travels only about 12" to its open position. O-rings 58 prevent air from passing between pin shaft 48 and the air cylinder assembly 54.

A bushing assembly 60 (FIG. 4) insures air-tightness between pin shaft 48 and upper valve disc 38. Suitably mounted to upper valve disc 38 is a bushing 64 having a guide bushing cylinder 66 interiorly thereof mounted within an annular cut-out 68 formed in an upper surface of upper valve disc 38. Guide bushing cylinder 66 is provided with a plurality of spaced interior recesses 70 therearound carrying O-rings 72 therein. A bushing plate 74 is secured to bushing 64 by bolt means 76, for example.

Dome 30 and vacuum chamber 10 are provided with equal pressures therein when equalizing valve 28 therebetween is opened and upper valve disc 38 is maintained in its closed and sealed position.

Coils 26 are maintained in a refrigerated state by refrigeration unit 78.

A drain valve 80 is provided to drain condensed liquid vapors formed by the refrigerated cold trap 26 during defrosting thereof, the condensate dripping into a trough 82 communicating with the drain valve.

We claim:

1. A high vacuum pumping system for evacuating a vacuum process chamber comprising
   pump means including a diffusion pump for evacuating said chamber,
   a double-seated poppet valve communicating with said chamber comprising
   a pair of spaced valve discs movable vertically within said valve between a lower closed position and an upper open position,
   a dome comprising a confinable volume within said poppet valve above said upper valve disc when in a closed position,
   refrigerated coils disposed within said dome,
   a diffusion pump communicating with said chamber through said poppet valve when said lower valve disc thereof is in an open position,
   means for maintaining equal pressure within said dome and said chamber when said valve discs are in a closed position,
   means for refrigerating said coils, and
   other means for moving said valve discs between said open and closed positions.

2. The system of claim 1 wherein drain valve means connected to said dome coacts with trough means within said dome for draining condensed vapors formed by said refrigerated coils.

3. The system of claim 2 wherein said condensed vapor formed by said refrigerated coils are desorbed from walls of said chamber.

4. The system of claim 1 wherein said valve discs are moved vertically by shaft means disposed axially said poppet valve, said shaft means movement responsive to air cylinder means mounted atop said poppet valve.

5. The system of claim 1 wherein said means for maintaining equal pressure within said dome and said chamber comprises an equalizing valve disposed intermediately conduit means connected therebetween.

6. The system of claim 1 wherein said valve discs are seated on respective flange members in air-tight relationship therewith when said poppet valve is in a closed position.

7. The system of claim 6 wherein bumper means are affixed to said shaft means for aiding in providing said air-tight relationship, said bumper means insuring said upper valve disc seats on its respective flange member prior to said lower valve disc seating on its respective flange member when said valve discs are moved vertically downwardly to their closed position.

8. The system of claim 6 wherein bumper means are affixed to said shaft means, said bumper means causing said lower valve disc to separate from its respective seating flange member prior to said upper valve disc separating from its respective seating flange member when said shaft means is moved vertically upwardly to place said poppet valve in an open position.

9. In a high vacuum pumping system provided with pump means for evacuating a vacuum process chamber, said pump means including a diffusion pump; a single seated poppet valve communicating directly with said chamber, and a refrigerated cold trap interposed between said poppet valve and inlet of said diffusion pump, the improvement to said system comprising
   a dual seated poppet valve having a dome portion at an upper end thereof, said cold trap disposed within said dome, said dual seated poppet valve comprising
   a pair of spaced valve discs movable vertically between a lower closed position and an open upper position, said dome portion defined by volume within said poppet valve above upper of said valve discs while seated atop an upper horizontally disposed flange member, lower of said valve discs seated atop a lower horizontally disposed flange member, said poppet valve being closed when said valve discs are seated atop respective flange members,
   said diffusion pump mounted below said lower valve disc and communicating with said chamber and dome when said lower valve disc is elevated to an open position,
   means for moving said valve discs vertically upwardly and downwardly,
   means for equalizing pressure within said dome and chamber when said upper valve disc is in a closed position, and
   means for refrigerating said cold trap.

* * * * *